Figure 1:
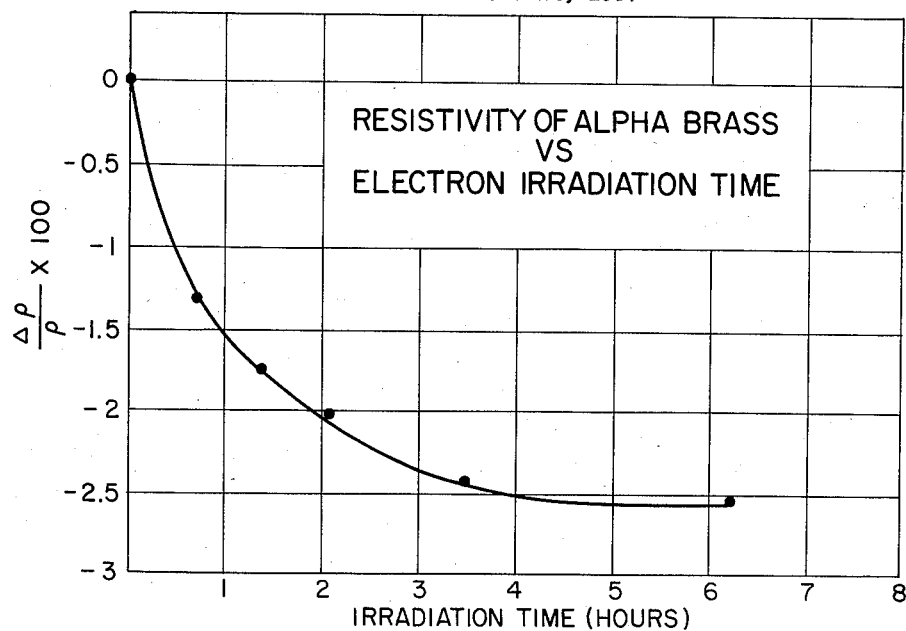

Nov. 3, 1959  A. C. DAMASK  2,911,533
ELECTRON IRRADIATION OF SOLIDS
Filed Dec. 24, 1957

INVENTOR.
ARTHUR C. DAMASK
BY

United States Patent Office 2,911,533
Patented Nov. 3, 1959

2,911,533

ELECTRON IRRADIATION OF SOLIDS

Arthur C. Damask, Ventnor, N.J., assignor to the United States of America as represented by the United States Atomic Energy Commission Application December 24, 1957, Serial No. 705,079

9 Claims. (Cl. 250—49.5)

This invention relates to a method for altering physical properties of certain solids. More particularly, it relates to a method for enhancing the usefulness of solids in which atomic interchange occurs through a vacancy mechanism by a controlled change of physical properties thereof through electron irradiation and temperature control.

I have discovered that it is possible to enhance the usefulness of solids in a certain class of metals, alloys and semiconductors. Basically, I accomplish this by enhancing the diffusion or displacement of atoms in those solids in which diffusion or displacement occurs through a vacancy mechanism. Each solid has a regular pattern or lattice of atomic sites where the component atoms of the solid preferentially locate. When diffusion occurs through a vacancy mechanism, an atom can only move when there exists a vacant atomic or lattice site in an adjacent position. (This phenomenon of diffusion or displacement of atoms in the class of solids which undergoes change through a vacancy mechanism is described more fully in "Imperfections in Nearly Perfect Crystals," W. Shockley et al., editors, Wiley, New York, 1952.) My use of the terminology in the description which follows corresponds to the manner in which the terminology is employed in the above-referenced text and in the art to which it pertains.

It is known, as pointed out in "Radiation Effects in Solids," Interscience, New York and London, 1957, by G. J. Dienes and G. H. Vineyard, that the number of vacancies created by high energy electron irradiation of any solid varies linearly with the electron flux. Further, it is known that the achievable value of many physical or macroscopic properties, such as resistivity or hardness, of a solid in which diffusion occurs through a vacancy mechanism often is strongly dependent on the relationship between its number of vacancies and temperature. I have discovered that the additional vacancies in a solid over those normally occurring at a given temperature, produced by high energy electron irradiation thereof at that temperature, allow diffusion of the component atoms of the solid to proceed at temperatures at which it would not occur under thermal means alone in any reasonable length of time. Thus, by utilizing my discovery, I am able to enhance diffusion and so improve many physical properties of some solids. This results because the physical properties are related to the number of vacancies, and I have discovered a precise way to increase the number of vacancies and thereby change the physical properties to a controlled degree.

In the practice of my invention I can accomplish one or more of the following advantages for solids in which diffusion occurs through a vacancy mechanism: enhanced diffusion, decreased or increased resistivity, increased magnetization, improved semiconductor junction sites, improved sintering, improved pressure bonding, improved diffusion across an interface, improved magnetostriction and increased hardness. This, then, is the objective of my invention.

Figure 2:
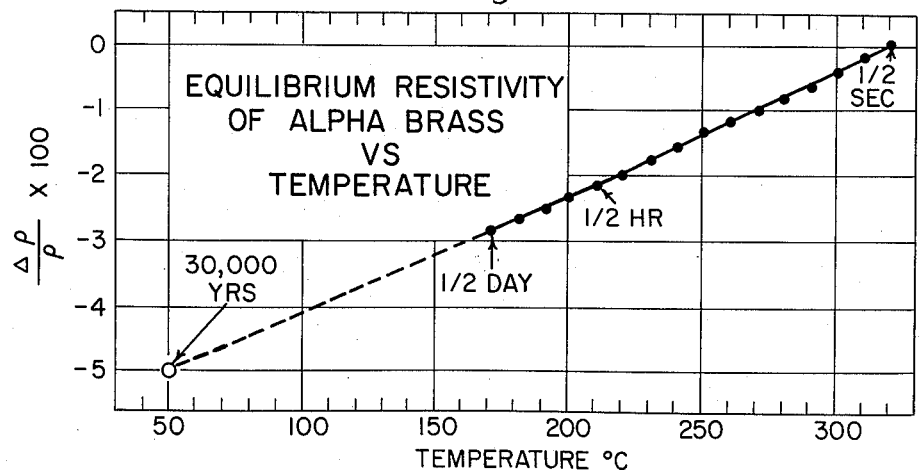
Figure 3:
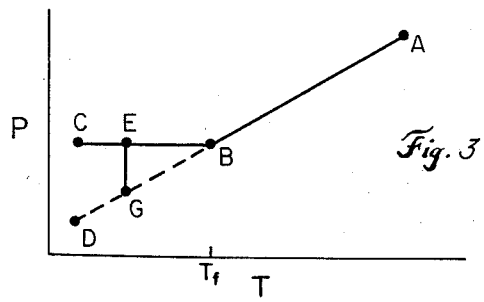

Other objects and advantages of the invention will be apparent in the following description and claims considered together with the accompanying drawing in which:

Figure 1 is a graph of the electrical resistivity of alpha brass against irradiation time in hours with an electron flux of approximately $2.6 \times 10^{14}$ electrons/cm.$^2$/sec. of approximately 2 mev. energy;

Figure 2 is a graph of the equilibrium resistivities of alpha brass measured at liquid nitrogen temperature against the temperature at which they are established; and Figure 3 is a generalized graph of the behavior under both thermal and electron irradiation treatment of a macroscopic property of a solid which diffuses by the vacancy mechanism. In Figure 3 there are illustrated both the variation of that property with temperature and the manner in which variations of the property not obtainable by thermal means alone can be obtained by electron irradiation.

The structure of each solid to which my invention is applicable, and herebelow I refer only to such a solid, is such that the solid has a regular pattern of lattice or atomic sites where the component atoms of the solid preferentially locate. A further characteristic of the solids in accordance with my invention is that diffusion, or the interchange of its component atoms among their respective atomic sites, occurs through a vacancy mechanism. A vacancy is the absence of an atom on an atomic site. Atomic interchange in a solid through a vacancy mechanism can most simply be understood through consideration of the interchange of two atoms by this mechanism: A first atom moves from its atomic site to an adjacent existing vacancy, a second atom adjacent the first atom moves from its atomic site to the newly created vacancy, and the first atom then moves to the vacancy left behind by the second atom.

The rate of diffusion in a solid of this type at a given temperature is proportional to the number of vacancies. Because of thermodynamic or energy-balance considerations there must always be vacancies present in a solid when it is at a temperature above absolute zero, and this number of vacancies decreases exponentially with decreasing temperature. Because of the decrease in number of vacancies with decreasing temperature and the proportionality of the rate of diffusion to this number, there exists a temperature called $T_f$ below which, for all practical purposes, the atoms are frozen in position. The processes that occur by the vacancy mechanism do not, practically speaking, take place below the temperature $T_f$. However, by the practice of my invention, I am able to increase the number of vacancies in a solid at any temperature by electron irradiation of the solid at that temperature. In one very important aspect of my invention, therefore, diffusion is permitted to proceed at low temperatures because of the aforementioned proportionality of diffusion rate to number of vacancies. When the irradiation temperature is above $T_f$, the electron irradiation speeds up change of the property P which otherwise may be producible by heat alone.

In order that this enhanced diffusion may be better understood, a generalized graph is shown in Figure 3 in which the values of a physical property of the solid P which depends on diffusion, such as resistivity, is plotted against temperature T. The graph illustrates a property which increases regularly with temperature, but this is only exemplary, and this discussion applies equally to properties which decrease with temperature or which vary less regularly than is illustrated. The property P associated with temperature T can be achieved in reasonable periods of time anywhere along the line $\overline{AB}$ by thermal means alone. Below the temperature $T_f$ (at point B), the atoms of the solid are, for all practical purposes, frozen in position and the property P cannot be decreased to the equilibrium value along the line $\overline{BD}$ by thermal means. Therefore, the value of property P remains essentially constant with temperature below $T_f$, as shown by line $\overline{BC}$. By my invention, I provide a method for making the property P approach the equilibrium value along the dashed line $\overline{BD}$ at temperatures below $T_f$, the dashed line being an extrapolation of $\overline{AB}$ toward zero temperature. I accomplish the change of the physical property P from along $\overline{BC}$ to along $\overline{BD}$ by irradiating the solid with electrons having energy above 0.5 million electron volts, mev., for example from the point E on line $\overline{BC}$ to the point G on line $\overline{BD}$ with the temperature remaining constant. Such an energy is required because an impinging electron must have sufficient energy to enter the solid and displace an atom from its atomic site upon striking it. The vacancy created in this fashion can cause atomic interchange in the solid in the same manner as a thermally created vacancy within a temperature range extending from the freezing-in temperature $T_f$ for component atoms down approximately 200° C. At very low temperatures atomic mobility is so small that even though vacancies are formed by electron irradiation, they have little effect on the diffusion, as the vacancies themselves are immobile. Above the temperature $T_f$, electron irradiation in accordance with this invention increases the speed with which thermal equilibrium is achieved.

Vacancies are created by electron irradiation of a solid to the depth of the electron penetration therein, and the physical properties thereof are only altered in a layer of this depth. This layer may, as illustrated hereafter, be only the surface of the solid, but for some applications, it is the entire depth of the solid.

The solids with which this is concerned are various. In alloys, for example, there are two or more different types of component atoms. When atoms of one component preferentially locate on atomic sites adjacent to atoms of another component, the alloy is known as an ordering alloy. Thus, an ordering alloy exhibits an ordered arrangement of atoms. There are many physical properties, such as resistivity, of alloys which depend upon the state of order. The maximum degree of order which can be achieved in an alloy is a function of temperature. However, at lower temperatures the time involved for ordering a solid by thermal means alone is so long because of the limited number of vacancies present that, for all practical purposes, the maximum degree of order is not obtainable. By my invention the introduction of additional vacancies into a solid by high energy electron irradiation at a given temperature below the freezing-in temperature $T_f$ (Figure 3) over the number normally present allows ordering to proceed to the degree theoretically producible by heat alone. When the temperature is above $T_f$, the order proceeds faster to the degree obtainable by heat alone.

When component atoms of an alloy preferentially locate on atomic sites adjacent to like atoms, the alloy is known as a precipitating alloy. Many physical properties of such an alloy, e.g., hardness, are dependent on the degree of precipitation. The maximum amount of precipitation obtainable in a precipitating alloy is also dependent upon the temperature of the alloy. At lower temperatures, below $T_f$ in Figure 3, the time involved for maximum precipitation by thermal means alone is so long, because of the limited number of vacancies present, that for all practical purposes, precipitation can not be obtained. In accordance with the invention, the high energy electron irradiation of a precipitating alloy at a given temperature below $T_f$ produces the necessary vacancies, and the precipitation proceeds to the theoretically obtainable value at that temperature. When the temperature is above $T_f$, the precipitation proceeds faster to the value obtainable by heat alone.

In diffusion between two solid objects in contact, there exists an interface between the respective solids. It may be said that the atoms of each piece at the surface thereof are approximately one atomic distance from atoms of the other piece. Diffusion of atoms across this interface produces an interchange of atoms between the two pieces. However, as indicated above, the rate of diffusion is temperature dependent and is limited by the number of vacancies present in each of the solids. By irradiation of the solid objects at the interface with the high energy electrons of my invention, the necessary vacancies are produced, and diffusion across the interface is promoted in a controlled manner.

There is a maximum depth of penetration in any particular solid for an electron of a given energy which increases with increasing electron energy. The magnitude of the depth of penetration varies inversely with the atomic masses of the component atoms of the solid.

As an example of my process, I have experimentally determined that the electrical resistivity of alpha brass is lowered by irradiation of samples thereof by 2 million volt electrons from a conventional Van de Graaff electron accelerator.

In my experiments I used alpha brass wires (70% copper and 30% zinc) drawn to 0.013 inch diameter. These wires were annealed at 400° C. to remove the effects of cold work. Probes for resistivity measurements were soldered on the wires. Then the wires were annealed at 210° C. for 45 minutes to establish an equilibrium order at that temperature. The alpha brass wires were about one inch long and were coiled in a small spiral about 4 mm. in diameter. Electron irradiation of the wires was carried out normal to the plane of the spiral. The temperature of the brass wires was kept at approximately 50° C. The electron flux was about $2.6 \times 10^{14}$ electrons/cm.$^2$/sec. The resistivities of the wires were measured at liquid nitrogen temperature between irradiations in a conventional way.

In Figure 1 there is shown a plot of my measurements of the percent change of the electrical resistivity, $\Delta \rho / \rho \times 100$, of alpha brass against the irradiation time in hours with 2 mev. electrons. This shows that irradiation of alpha brass with a certain electron flux causes the resistivity thereof to decrease with time of irradiation and to approach a limiting value asymptotically.

In Figure 2 the solid circles show the thermal equilibrium resistivities of alpha brass wires at various temperatures measured at liquid nitrogen temperature (J. Appl. Phys. 27, 610, 1956). These data were obtained by annealing the alpha brass wires, quenching them and then measuring their resistivity at liquid nitrogen temperature. The necessary annealing time is indicated at several points along the curve. The open circle of Figure 2 represents the electrical resistivity achieved in alpha brass wires by my electron irradiation thereof as represented by Figure 1. It is the same resistivity as that which would be obtained through thermal means alone by holding the sample at 50° C. for approximately 30,000 years. (The changes in resistivity (ordinates) of Figures 1 and 2 have different bases from which the changes were measured. In Figure 1 the change is measured from the value of resistivity at 210° C. in Figure 2, since the samples used for the measurements of Figure 1 were brought to equilibrium at that temperature prior to electron irradiation. On the other hand, the ordinate scale of Figure 2, a percent change, is based on the 320° C. value of resistivity.)

There are many other processes which, from an industrial viewpoint, would take too long to carry out by heat treatment alone and so are quite impractical. By the practice of my invention, many such processes are now practical.

Alpha brass is an alloy in which diffusion and macroscopic phenomena, such as resistivity, obey the same temperature exponential law. Accordingly, such measurements on an alloy are a measure of the atomic interchange occurring under unhanced diffusion by electron irradiation in any alloy even through its macroscopic phenomena obey a more complex law. Based on my experiments, the factor by which atomic diffusion increases varies linearly with the electron flux; for example, irradiation of any solid with an electron flux of about $2.6 \times 10^{14}$ electrons/cm.$^2$/sec. will speed up atomic diffusion by a factor at least up to $10^7$ depending upon the temperature. At higher temperatures the gain is smaller because there are more thermally produced vacancies. Any given electron flux will speed up diffusion by a factor at least up to $K \times 10^7$ where $K=1$ for an electron flux of $2.6 \times 10^{14}$ and changes linearly with changes in the flux. Accordingly, by the practice of my invention, new low-temperature states of alloys can be achieved which can not be obtained by thermal means alone.

An experimental method for determining whether diffusion occurs by a vacancy mechanism in a particular solid and which is useful in the present method is described fully in Progress in Metal Physics, volume 4, page 265 et seq., Pergamon Press, Ltd., London. Generally, it involves imbedding inert wires or markers at two interfaces of a system involving the solid and noting whether the markers move in a particular way.

My invention involves a combination of electron irradiation of certain solids with other steps to produce novel and useful products. Products are produced both faster at higher temperatures and in a reasonable length of time at lower temperatures as compared with heat treatment alone. The former is particularly important where time is of the essence. The latter lessens difficulties concomitant with heat treatment at higher temperatures, e.g., corrosion problems and requirements of special atmospheres.

Among the practical processes in accordance with my invention, the following are particularly valuable:

(1) The decrease or increase of resistivity of ordering alloys.

(2) The control of the depth of diffusion of atoms across an interface between two metals; the interface may be established by forming a metallic layer on a metal body by a conventional technique such as electroplating or vapor-deposition. Then diffusion is accomplished by irradiating the layer below the freezing-in temperature with electrons of sufficiently high energy to pass through the layer and into the metal body with an energy above 0.5 mev.

(3) The increase of atomic interchange across an intermetallic interface between two metals, established by forming a metallic layer on a metal body by a conventional technique such as electroplating or vapor-deposition, by irradiating the layer with electrons of sufficiently high energy to penetrate the layer and pass into the metal body with an energy above 0.5 mev.

(4) The increase in the rate of sintering of finely divided solid material by irradiating the material at a temperature where the vacancies formed thereby are immobile and then raising the temperature until the vacancies are mobile.

(5) Enhancement of the bonding of two pieces of solid by irradiating the surfaces to be bonded with electrons at a temperature where the vacancies formed thereby are immobile and subjecting the pieces to pressures transverse to the surfaces at a temperature where the vacancies are mobile.

I am able to carry out these processes involving sintering or bonding or diffusion at a lower temperature or at a greater rate than has heretofore been possible. In some instances, results can be obtained which heat alone could not achieve.

Alloys useful in the processes itemized above, as determined by the above-referred-to experimental method, as copper-zinc, copper-nickel, silver-gold, silver-palladium, nickel-cobalt, nickel-gold, nickel-iron. The composition of each element listed can be from 0 to 100% of the alloy system indicated.

At certain compositions, the ordering alloys copper-tin and copper-aluminum may also be treated in accordance with this invention, i.e., when their composition is such that the crystal structure is face-centered cubic.

By the practice of my invention I also: increase the magnetization of ferromagnetic alloys such as $MnNi_3$; increase the magnetostriction of certain alloys such as $FeNi_3$; decrease the resistivity of ferrites such as $MgFe_2O_4$ and so obtain a diminution of power losses therein due to eddy currents; increase the magnetization of ferromagnetic alloys such as $MnNi_3$; and increase the hardness of precipitating alloys by increasing the amount or rate of precipitation.

Further, by my invention, I control the depth of n- and p- impurity elements such as tin and antimony respectively, at a junction site in a semiconductor such as germanium. Since there is a sharp cut-off in the penetration depth in the semiconductor for electrons of a particular energy, by selecting electrons of that energy, I establish the junction site at a desired depth in the semiconductor by irradiating it at a temperature below the freezing-in value.

While my invention has been disclosed with respect to several preferred applications and embodiments, it will be apparent to those skilled in the art that numerous variations and modifications may be made within the spirit and scope of the invention and thus it is not intended to limit the invention except as defined by the following claims.

I claim:

1. A method for changing the value of the resistivity of an alloy which exhibits an ordered arrangement of atoms, said alloy being one in which atomic diffusion occurs by a vacancy mechanism, and in which the resistivity varies with the degree of order, and for which there is a theoretically producible equilibrium resistivity at any particular temperature, and for which there is a vacancy freezing-in temperature below which heat alone imparted to said alloy will not produce said equilibrium resistivity, the method comprising the steps of holding the temperature of a zone of a piece of said alloy below said freezing-in temperature while irradiating said zone with electrons having an energy of at least 0.5 mev. until the resistivity of said zone approaches a predetermined percentage of the equilibrium resistivity at said holding temperature.

2. A method for increasing the value of the magnetization of a ferromagnetic alloy which exhibits an ordered arrangement of atoms, said alloy being one in which atomic diffusion occurs by a vacancy mechanism, and in which there is a higher magnetization when there is a higher degree of order, and for which there is a theoretically producible equilibrium magnetization at any particular temperature, and for which there is a vacancy freezing-in temperature below which heat alone imparted to said alloy will not produce said equilibrium magnetization, the method comprising the steps of irradiating a zone of a piece of said alloy with electrons having an energy of at least 0.5 mev. until the magnetization of said zone approaches a predetermined percentage of the equilibrium magnetization at a holding temperature below said vacancy freezing-in temperature and cooling said zone during irradiation at a rate sufficient to maintain said holding temperature.

3. A method for increasing the value of the order of an alloy which exhibits an ordered arrangement of atoms, said alloy being one in which atomic diffusion occurs by a vacancy mechanism, and for which there is a theoretically producible equilibrium degree of order at any particular temperature, and for which there is a vacancy freezing-in temperature below which heat alone imparted to said alloy will not produce said equilibrium degree of order, the method comprising the steps of holding the temperature of a zone of a piece of said alloy below said freezing-in temperature while irradiating said zone with electrons having an energy of at least 0.5 mev. until the degree of order of said zone approaches a predetermined percentage of the equilibrium degree of order at said holding temperature.

4. A method for increasing the value of the precipitation of a precipitating alloy, said alloy being one in which atomic diffusion occurs by a vacancy mechanism, and for which there is a theoretically producible equilibrium degree of precipitation at any particular temperature, and for which there is a vacancy freezing-in temperature below which heat alone imparted to said alloy will not produce said equilibrium degree of precipitation, the method comprising the steps of holding the temperature of a zone of a piece of said alloy below said freezing-in temperature while irradiating said zone with electrons having an energy of at least 0.5 mev. until the degree of precipitation of said zone approaches a predetermined percentage of the equilibrium degree of precipitation at said holding temperature.

5. A method for increasing the value of the magnetostriction of an alloy which exhibits an ordered arrangement of atoms, said alloy being one in which atomic diffusion occurs by a vacancy mechanism, and in which there is a greater magnetostriction when there is a higher degree of order, and for which there is a theoretically producible equilibrium magnetostriction at any particular temperature, and for which there is a vacancy freezing-in temperature below which heat alone imparted to said alloy will not produce said equilibrium magnetostriction, the method comprising the steps of holding the temperature of a zone of a piece of said alloy below said freezing-in temperature while irradiating said zone with electrons having an energy of at least 0.5 mev. until the magnetostriction of said zone approaches a predetermined percentage of the equilibrium magnetostriction at said holding temperature.

6. A method for varying the depth of diffusion of n- and p- impurity elements at a semiconductor junction site, said semiconductor being one in which atomic diffusion occurs by a vacancy mechanism, and for which there is a vacancy freezing-in temperature, the method comprising the steps of holding the temperature of said junction site below said freezing-in temperature while irradiating said junction site with electrons having an energy of at least 0.5 mev. until the desired depth of diffusion is obtained.

7. A method for varying the depth of diffusion of atoms across an interface between a metal layer and a metal body, said metal body being one in which atomic diffusion occurs by a vacancy mechanism, and for which there is a vacancy freezing-in temperature, the method comprising the steps of forming a metal layer on a metal body to establish an interface, holding the temperature of said interface below the vacancy freezing-in temperature of said metal body while irradiating said metal layer with electrons of a sufficiently high energy to penetrate said layer and pass into said metal body with an energy above 0.5 mev. until the desired depth of diffusion is obtained.

8. A method for increasing the rate of sintering of finely divided solid material in which atomic diffusion occurs by a vacancy mechanism and for which there is a temperature below which vacancies are not mobile, the method comprising the steps of holding the temperature of said material below said temperature while irradiating said material with electrons having an energy above 0.5 mev. and thereafter raising the temperature of said material until the vacancies are mobile.

9. A method for bonding two pieces of solid in which atomic diffusion occurs through a vacancy mechanism for which there is a temperature below which vacancies are not mobile, the method comprising the steps of holding the surfaces to be bonded below said temperature while irradiating said surfaces with electrons having an energy greater than 0.5 mev., placing said pieces in intimate contact, subjecting said pieces to pressure transverse to said surfaces and raising the temperature of said pieces to a temperature at which the vacancies are mobile.

References Cited in the file of this patent

UNITED STATES PATENTS

| | | |
|---|---|---|
| 1,998,496 | Fiedler | Apr. 23, 1935 |
| 2,771,568 | Steigerwald | Nov. 20, 1956 |
| 2,778,926 | Schneider | Jan. 22, 1957 |
| 2,793,281 | Steigerwald | May 21, 1957 |
| 2,793,282 | Steigerwald | May 21, 1957 |
| 2,809,905 | Davis et al. | Oct. 15, 1957 |
| 2,816,847 | Shockley | Dec. 17, 1957 |
| 2,845,371 | Smith | July 29, 1958 |

FOREIGN PATENTS

| | | |
|---|---|---|
| 721,969 | Great Britain | Jan. 19, 1955 |
| 779,190 | Great Britain | July 17, 1957 |
| 1,141,535 | France | Mar. 18, 1957 |